No. 754,471. PATENTED MAR. 15, 1904.
J. H. MANN.
MACHINE FOR MAKING LAMPBLACK.
APPLICATION FILED OCT. 21, 1903.
NO MODEL. 2 SHEETS—SHEET 1.

Witnesses
E. F. Stewart
Jno. E. Parker

John H. Mann, Inventor.
by C. A. Snow & Co.
Attorneys.

No. 754,471. PATENTED MAR. 15, 1904.
J. H. MANN.
MACHINE FOR MAKING LAMPBLACK.
APPLICATION FILED OCT. 21, 1903.
NO MODEL. 2 SHEETS—SHEET 2.

John H. Mann, Inventor.

Witnesses
by C. A. Snow & Co.
Attorneys

No. 754,471.  
Patented March 15, 1904.

UNITED STATES PATENT OFFICE.

JOHN HENRY MANN, OF WEST UNION, WEST VIRGINIA.

MACHINE FOR MAKING LAMPBLACK.

SPECIFICATION forming part of Letters Patent No. 754,471, dated March 15, 1904.

Application filed October 21, 1903. Serial No. 177,978. (No model.)

*To all whom it may concern:*

Be it known that I, JOHN HENRY MANN, a citizen of the United States, residing at West Union, in the county of Doddridge and State of West Virginia, have invented a new and useful Machine for Making Lampblack, of which the following is a specification.

This invention relates to certain improvements in apparatus of that class employed in the manufacture of lampblack, and has for its principal object to provide means whereby more than one grade of black may be produced by a single apparatus and, further, to provide means for controlling grade of the product and to provide means for the economical manufacture thereof.

A further object of the invention is to provide a structure that will permit of ready adjustment of the mechanism for the production of black of the desired quality.

A still further object of the invention is to provide improved means for effecting the removal of the black from the deposit plates or strips without danger of clogging the burner-nipples of the apparatus.

A still further object of the invention is to provide a structure so arranged as to save the loose or floating particles of carbon that may ascend above the deposit-plates and to direct the same to a common discharge-point without danger of their accumulation on the nipples or burners.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
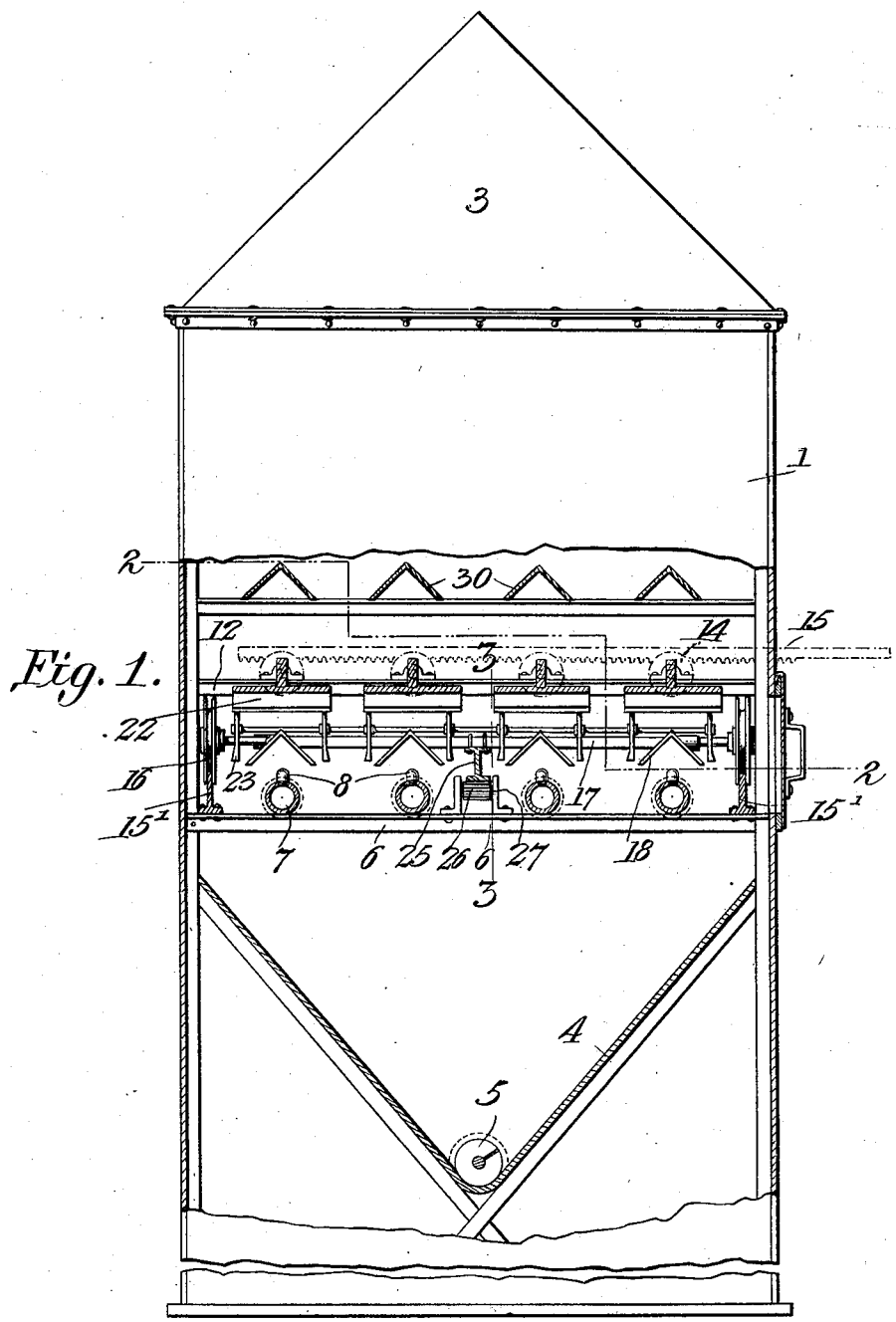
Figure 2:
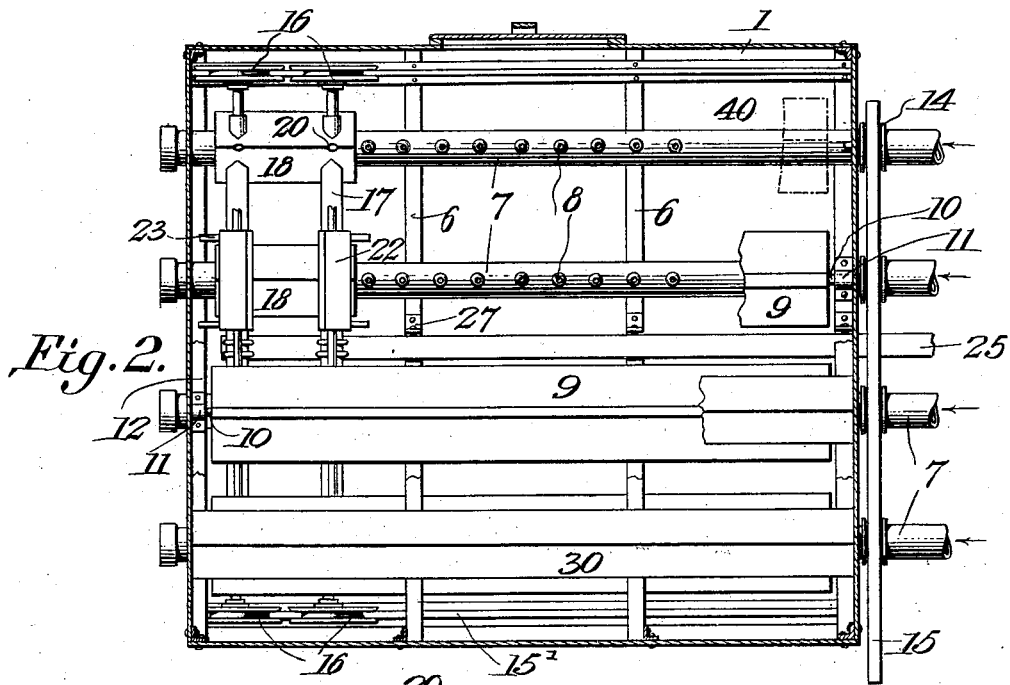
Figure 5:
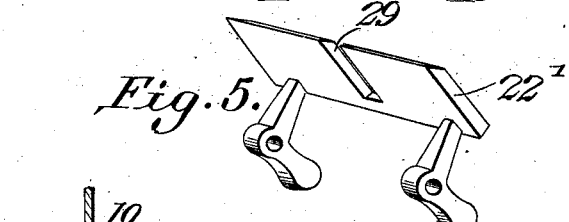
Figure 3:
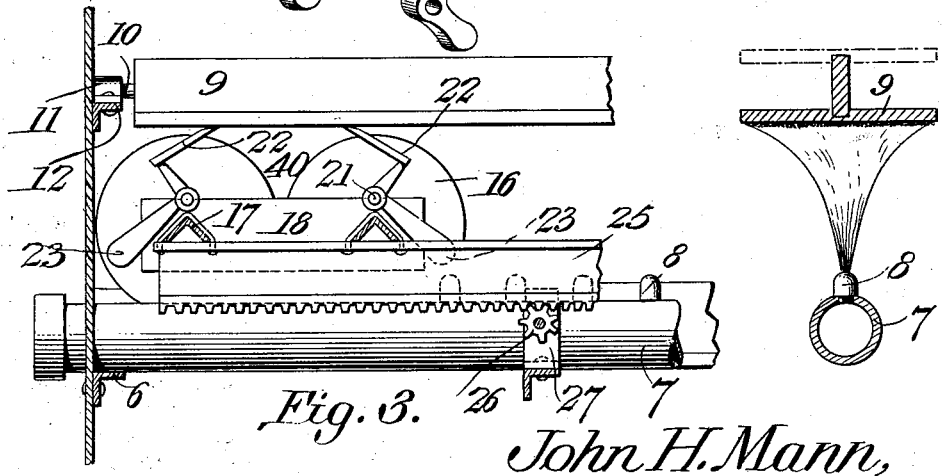
Figure 4:
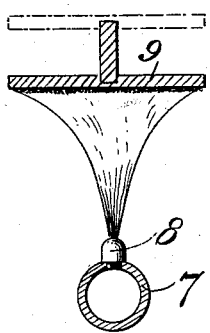

In the accompanying drawings, Figure 1 is a transverse sectional view of an apparatus for manufacturing lampblack constructed in accordance with the invention. Fig. 2 is a sectional plan view of the same on the line 2 2 of Fig. 1. Fig. 3 is a sectional view on the line 3 3 of Fig. 1, drawn to an enlarged scale and illustrating the construction and arrangement of the mechanism for removing the lampblack from the depositing-plates. Fig. 4 is a transverse sectional elevation of a portion of the apparatus, illustrating the relative positions of one of the depositing-plates and the burner-pipe. Fig. 5 is a detail perspective view of one of the scrapers detached.

Similar numerals of reference are employed to indicate corresponding parts throughout the several figures of the drawings.

In the manufacture of lampblack from hydrocarbons it is found that aside from adjustment of the quantity of hydrocarbon consumed the shape of the depositing-surface and its distance from the jet materially affect the quality of the carbon, and if the depositing-surface be disposed but a short distance above the burner-tip a comparatively coarse black will be quickly formed, while, on the other hand, the raising of the depositing-surface to a greater distance above the nipple will result in the formation of a finer quality of black at a decrease in the speed of production. The shape of the depositing-surface will also alter the quality of the product, inasmuch as there is formed immediately above the jet a gray or burned carbon, which when mingled with the black results in deterioration of the whole product. When the depositing-surface is flat, the gray or burned carbon will accumulate along its center; but by reducing the area of impact immediately above the jet it is found that the quantity so deposited will be materially decreased, and this may be accomplished by forming the depositing member of T shape in cross-section and placing the narrow central vertical web immediately above the nipple.

In carrying out the present invention an apparatus is built in such manner as to enable its ready adjustment for the rapid production of a low-grade black when necessary or for the manufacture of black of the best quality at a correspondingly slower speed.

In the drawings, 1 represents a suitable casing, preferably formed of sheet metal or similar material and provided with a pyramidal top 3 and a hopper-shaped bottom 4, the latter being provided with a screw conveyer 5, by means of which the finished product can be removed from the apparatus. Extending transversely of the casing are angle or T irons 6, on which are supported a plurality of burner-pipes 7, having suitable nipples 8, the pipes being connected at a point outside the casing to any suitable source of supply. The nipples are arranged preferably at equidistant intervals throughout an intermediate portion of the length of the pipe; but near each end of the casing the pipes are preferably turned in order to form a space for the reception of the scrapers and the supporting mechanisms therefor. At a point above and in vertical alinement with the axis of each of the pipes is a depositing plate or member 9 in the form of a bar T shape in cross-section, and from the vertical webs extend pivot - pintles 10, fitted within suitable bearing 11, carried by transversely - disposed supporting - bars 12. One of the pintles of each plate extends out through an opening in the end of the casing and carries a pinion 14, with which meshes a rack 15, to which longitudinal movement may be imparted in any suitable manner in order to simultaneously revolve all of the plates, and thus press either of the surfaces downward for the accumulation of the black. When the plane face is forming the depositing - surface, a comparatively coarse grade of lampblack will be produced, owing in part to the fact that the depositing-surface is quite near the nipple; but when the plates are reversed the horizontal surface is raised for considerable distance above the jet, owing to the fact that the pivot-pintles are connected to the ends of the vertical web. By suitable alteration in the position of the pivot-pintles the horizontal plane assumed by the depositing-surface may be altered as required. The vertical web when arranged for the impact of the jet will receive the accumulation of gray or burned carbon, while the jet will be divided and deposit its carbon equally on the two flat faces on opposite sides of said web. The distance between the two planes assumed by the depositing-surfaces will be seen on reference to Fig. 4, wherein the full-line position represents the plane surface right near the jet, while the dotted-line position shows the plane assumed by the depositing-surface when the vertical web is facing the jet.

The transverse bars 6 support rails 15', that extend longitudinally of the machine, near the side walls thereof, and serve as supports for the grooved wheels 16 of a transversely-disposed scraper-supporting frame. This frame is formed of a pair of parallel bars 17, that carry hoods 18 of inverted-V shape in cross-section, the hoods being of a length somewhat less than the distance between the ends of the casing and the nipples. In the upper face of each of the hoods, at the apex thereof, are notches 20, in which rest transversely - disposed spindles 21, carrying oppositely-facing scraper-blades 22, one of which serves for the removal of the accumulations of black during movement of the scraper-frame in one direction, while the other acts in a similar manner on the movement of the frame in the opposite direction. These blades are counterbalanced by weights 23 and are held lightly against the depositing-surfaces to permit yielding when necessary; but this is seldom found necessary, inasmuch as the plates are formed of continuous bars and have no joints to catch or retard the movements of the scrapers. To actuate the scrapers, a longitudinally-disposed bar 25 extends through the central portion of the machine and is provided on its under face with ratchet-teeth for engagement with one or more idler-pinions 26, supported by small brackets 27, and by preference the machines are built in pairs, and the scrapers of adjacent machines are connected to a single operating-bar, so that one actuating mechanism may be employed for both scraper-frames.

In the operation of the apparatus the gas or other material is fed through the pipes 7 and forced under slight pressure through the nipples 8, the jets impinging on the plates 9 and the unconsumed carbon being deposited thereon. At suitable intervals the scraper-frames are drawn from one end of the apparatus to the other, and the scrapers serve to remove the accumulated lampblack, which falls on the hoods and is deflected by said plates into the hopper. During the scraping operation the hoods serve to prevent any of the lampblack falling onto the nipples, so that it becomes unnecessary to frequently clean the same. The space 40 at each end of the apparatus between the end nipples and the wall is such that the scrapers may rest at either end of the apparatus during intervals of operation and without interfering with the jets issuing from any of such nipples.

When the depositing-plates are inverted, so that the vertical webs are opposite the nipples, it becomes necessary to remove the scrapers and to substitute therefor scrapers 22' of the character shown in Fig. 5. These scrapers are practically of the same construction as already described, but are provided with central slots or recesses 29 in order to clear the vertical web of the depositing-surface.

In the manufacture of lampblack with apparatus of the character described loose particles of carbon are even carried up above the depositing-plates through the upper portion of the casing and in descending accumulate on the burner-pipes or the nipples. This black is of the finest quality, and in order to prevent injury thereto, as well as to avoid clogging the nipples, I arrange the deflectors or hoods 30 in vertical alinement with each burner-pipe, as shown in Fig. 1. As these deflectors are of inverted-V shape, the particles of carbon will be directed downward between the depositing-plates and the burner-pipes and will pass to the hopper and thence be discharged with the material removed by the scrapers.

It is obvious that the necessary adjustment of the depositing-plates for the manufacture of high or low grades of black may be quickly accomplished, and the expense incident to the construction of two separate machines is thus found unnecessary.

Having thus described the invention, what is claimed is—

1. In apparatus for the manufacture of lampblack, a reversible plate or strip having depositing-faces of different character.

2. In apparatus for the manufacture of lampblack, a reversible plate or strip of which both sides form depositing-surfaces, and means for reversing the strip to expose either side to the burner, the surfaces being disposed respectively at different distances from said burner when in operative position.

3. In apparatus for the manufacture of lampblack, a plate or strip of which both sides form depositing-surfaces, and a pivotal supporting means, the axis of which is in a plane parallel with but out of alinement with both surfaces thereby to present such surfaces at different distances from the burner.

4. In apparatus for the manufacture of lampblack, the combination with a burner, of a depositing-plate formed of a pivotally-supported strip of metal having its opposite sides of different character and reversible to expose either of its sides to the burner.

5. In apparatus for the manufacture of lampblack, the combination with a burner, of a pivotally-mounted metallic strip of T shape in cross-section and reversible to expose either of its sides to the burner.

6. In apparatus for the manufacture of lampblack, the combination with a burner, of a metallic strip of T shape in cross-section and reversible to expose either of its sides to the burner, and pivotal supports connected to the vertical web of the strip.

7. In apparatus for the manufacture of lampblack, a burner-tube having a plurality of nipples, a strip or plate arranged above the tube and forming a depositing-surface, a wheeled frame movable longitudinally of the tubes between the latter and the strip, a hood or deflecting-plate carried by the frame, and a pair of oppositely-disposed scraping-blades carried by the frame at points above the plate and operable respectively in opposite directions.

8. In apparatus for the manufacture of lampblack, a burner-tube having a plurality of nipples, a strip or plate arranged above the hood and forming a depositing-surface, a wheeled frame extending between the tube and strip, a hood carried by the frame and forming a deflector, a pair of transversely-arranged bars in part supported by the hood, and oppositely-mounted counterweighted scrapers carried by the said bars.

9. In apparatus for the manufacture of lampblack, a casing, a burner-tube extending longitudinally thereof, a row of nipples carried by the burner-tube, the end nipples of the row being spaced from the walls of the casing, a wheeled frame, a deflector-hood carried by the frame and of a length less than the distance between the end nipples, and the casing-wall, and scrapers carried by said frame.

10. In apparatus for the manufacture of lampblack, a casing, burners, depositing-plates all arranged within the casing and spaced from each other, and inverted-V-shaped deflectors arranged in the upper portion of the casing at points over the depositing-surfaces and serving to direct particles of loose carbon between them.

11. In apparatus for the manufacture of lampblack, a burner-tube having a plurality of nipples, a reversible depositing-strip of T shape in cross-section, a deflecting-hood, a frame carrying the same and loosely-mounted interchangeable scrapers carried by said hood.

In testimony that I claim the foregoing as my own I have hereto affixed my signature in the presence of two witnesses.

JOHN HENRY MANN.

Witnesses:
  G. C. CROUSE,
  J. A. FREEMAN.